United States Patent [19]
Chi

[11] Patent Number: 5,927,741
[45] Date of Patent: Jul. 27, 1999

[54] CUSHION DEVICE FOR A BICYCLE

[76] Inventor: Yi-Chen Chi, No. 139-5, An Mei Rd., Mie Shan Village Hou Li Hsiang Taichung Hsien, Taiwan

[21] Appl. No.: 09/210,887

[22] Filed: Dec. 15, 1998

[51] Int. Cl.⁶ .............................. B62K 19/00; B62K 25/00
[52] U.S. Cl. ............................................. 280/275; 280/283
[58] Field of Search ..................................... 280/275, 276, 280/283, 284, 286, 287

[56] References Cited

U.S. PATENT DOCUMENTS

| | | | |
|---|---|---|---|
| 5,553,881 | 9/1996 | Klassen et al. | 280/284 |
| 5,593,168 | 1/1997 | Char | 280/275 |
| 5,628,524 | 5/1997 | Klassen et al. | 280/284 |
| 5,725,225 | 3/1998 | Lai | 280/275 |

Primary Examiner—Chris Schwartz
Attorney, Agent, or Firm—Rosenberg, Klein & Bilker

[57] ABSTRACT

A cushion device includes two lugs extending from the seat post of the bicycle and two positioning members respectively extend through the two lugs. A connecting member is pivotally connected between the two lugs and has two cone-shaped recesses defined in the two ends thereof. Each of the two positioning members has a cone-shaped end which is received in the corresponding cone-shaped recess. A pin extends through the two positioning members and the connecting member with two anti-thrust bearings mounted to the two positioning members. Two ring members are respectively connected to the two lugs and let the two bearings be located between the two ring members and the two positioning members.

5 Claims, 5 Drawing Sheets

CUSHION DEVICE FOR A BICYCLE

FIELD OF THE INVENTION

The present invention relates to a cushion device, and more particularly, to a cushion device connected to the seat post and having two cone-shaped members through which the pin extends so that the force applied the cushion device can be shared by the two cone-shaped members.

BACKGROUND OF THE INVENTION

FIGS. 4 and 5 show a conventional cushion device which is connected to the bottom bracket 10 of a bicycle and has two lugs 11 extending radially outward from the bottom bracket 10, a connecting member 12 pivotally connected between the two lugs 11 with a pin 16 extending through the connecting member 12. The two chain stays 13 extend from the connecting member 12 with the rear wheel (not shown) located between the two chain stays 13. Therefore, when the bicycle is ridden on a serrated road, the rear wheel connected between the two chain stays 13 jumps up and down to absorb the shocks. Two pairs of bearings 15 are respectively connected to two ends of the pin 16 and received in the two lugs 11, a bolt 14 extending into one of two ends of the pin 16 so as to position the two bearings 15. The cushion device will let the pin 16 bear most of the force when the rear wheel jumps up and downward so that the pin 16 has to be manufactured by tough material which is expensive. In addition, when the force is transferred to the pin 16, the two bearings 15 have the tendency to unexpectedly shift toward each other so that the bearings 15 could loose their function. Furthermore, dust is easily entered into the gaps between the bearings 15, the pin 16 and the bolt 14, especially when the bicycles equipped with the cushion device are ridden on rugged roads.

The present invention intends to provide a cushion device wherein the force transferred to the cushion device is dispensed by two cone-shaped members which are engaged with the connecting member and the pin extends through the two cone-shaped members and the connecting member so that the above-mentioned problems are well mitigated.

SUMMARY OF THE INVENTION

In accordance with one aspect of the present invention, there is provided a cushion device for a bicycle comprising two lugs extending radially outward from the seat post of the bicycle and each of the lugs having a hole defined therethrough. Two recesses are respectively defined in the outside of the two lugs and communicate with the two holes. Two positioning members each have a cone-shaped end extending through the hole of the lug corresponding thereto and a passage defined therethrough.

A connecting member is located between the two lugs and has two cone-shaped recesses respectively defined in two ends thereof A central hole is defined through the connecting member and communicates with the two cone-shaped recesses in which the two cone-shaped ends of the two positioning members are respectively received. A pin extends through the passages of the two positioning members and the central hole of the connecting member.

Two ring members are respectively received in the two recesses of the two lugs and two bearings are respectively received between the two positioning members and the two ring members.

The object of the present invention is to provide a cushion device which dispenses the shocks transferred to the pin by the two positioning members and the connecting member so as to prolong the term of use of the pin.

Further objects, advantages, and features of the present invention will become apparent from the following detailed description with appropriate reference to the accompanying drawings.

DETAILED DESCRIPTION OF THE PREFERRED EMBODIMENT

Figure 1:
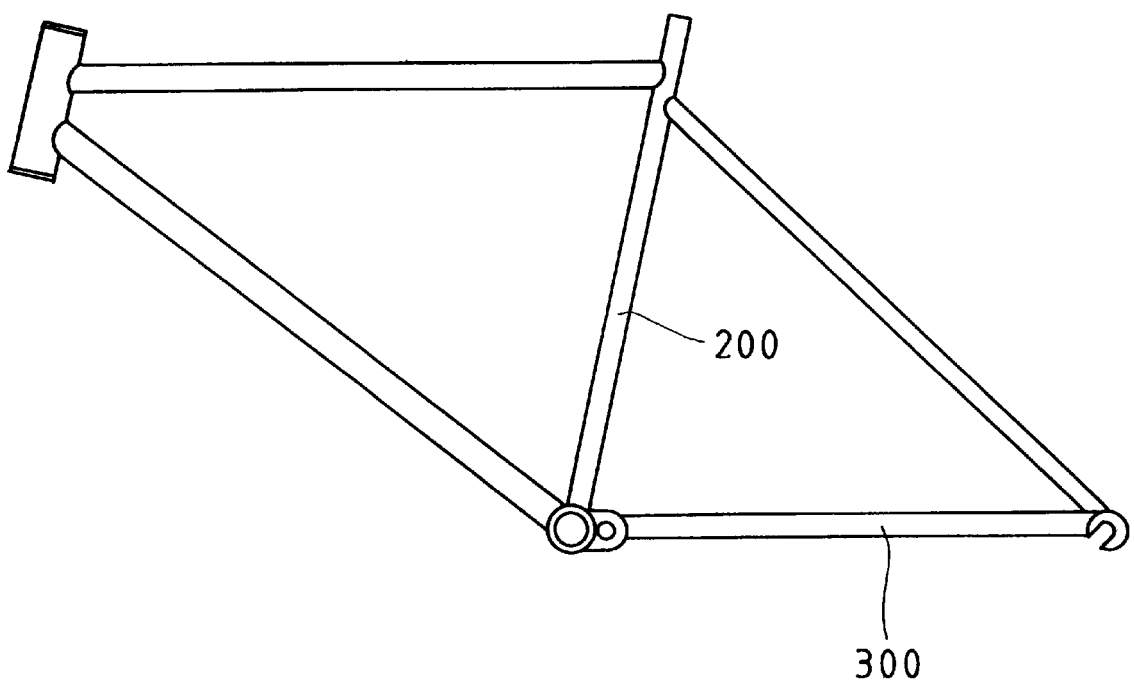
FIG. 1 is an illustrative view to illustrate the bicycle frame having the cushion device in accordance with the present invention.
Figure 2:
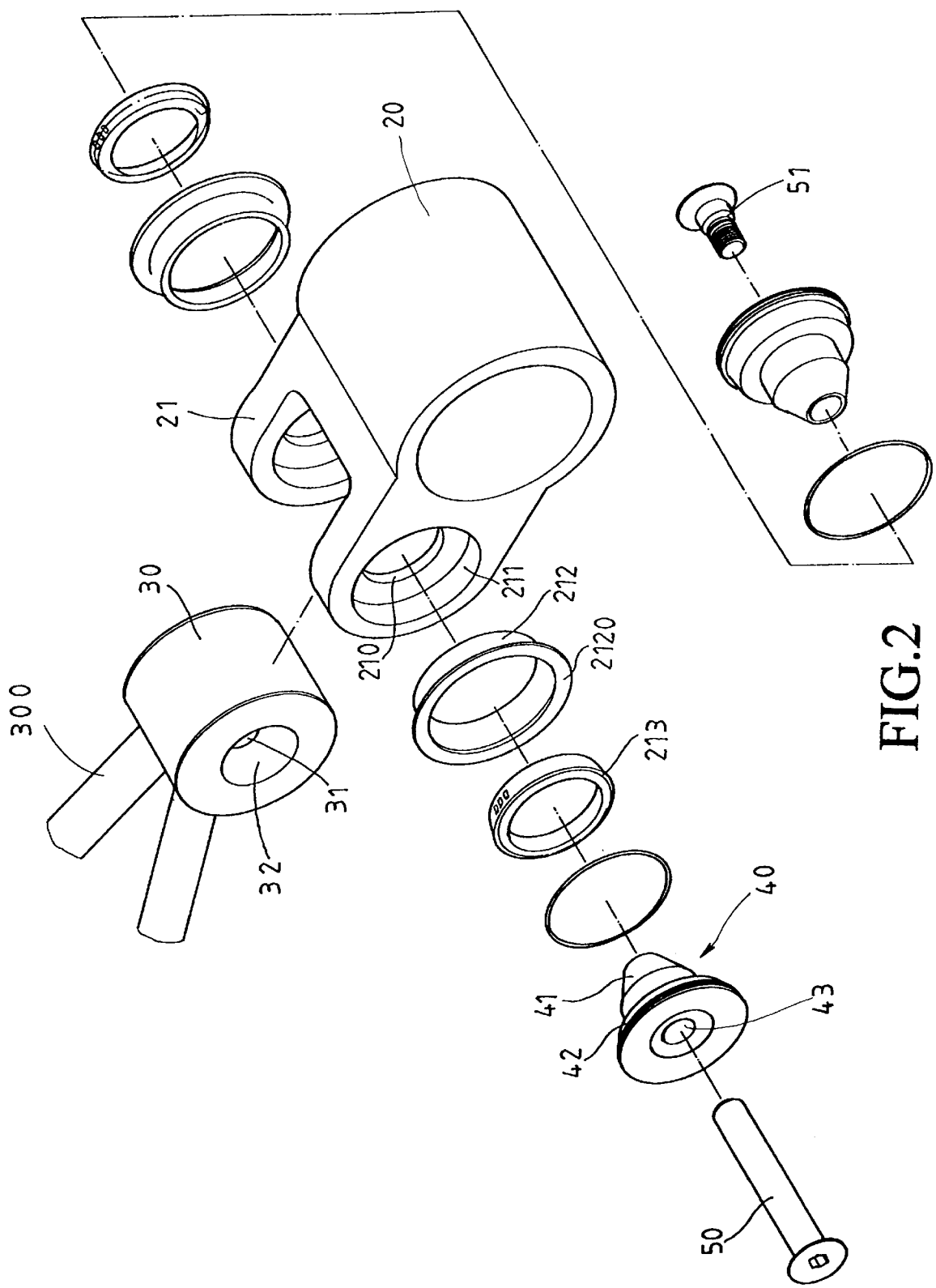
FIG. 2 is an exploded view of the cushion device in accordance with the present invention.
Figure 3:
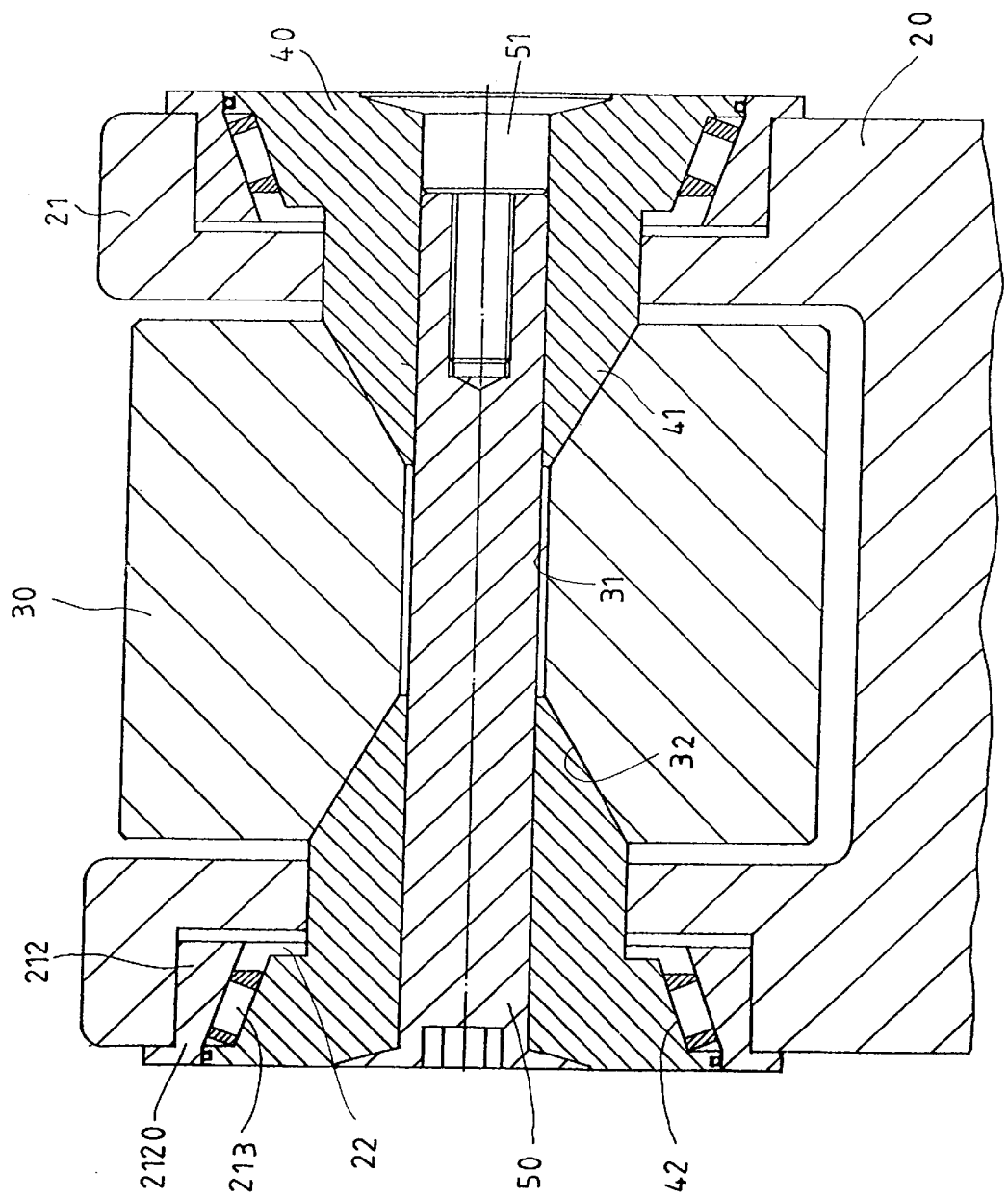
FIG. 3 is a side elevational view, partly in section, of the cushion device in accordance with the present invention.
Figure 4:
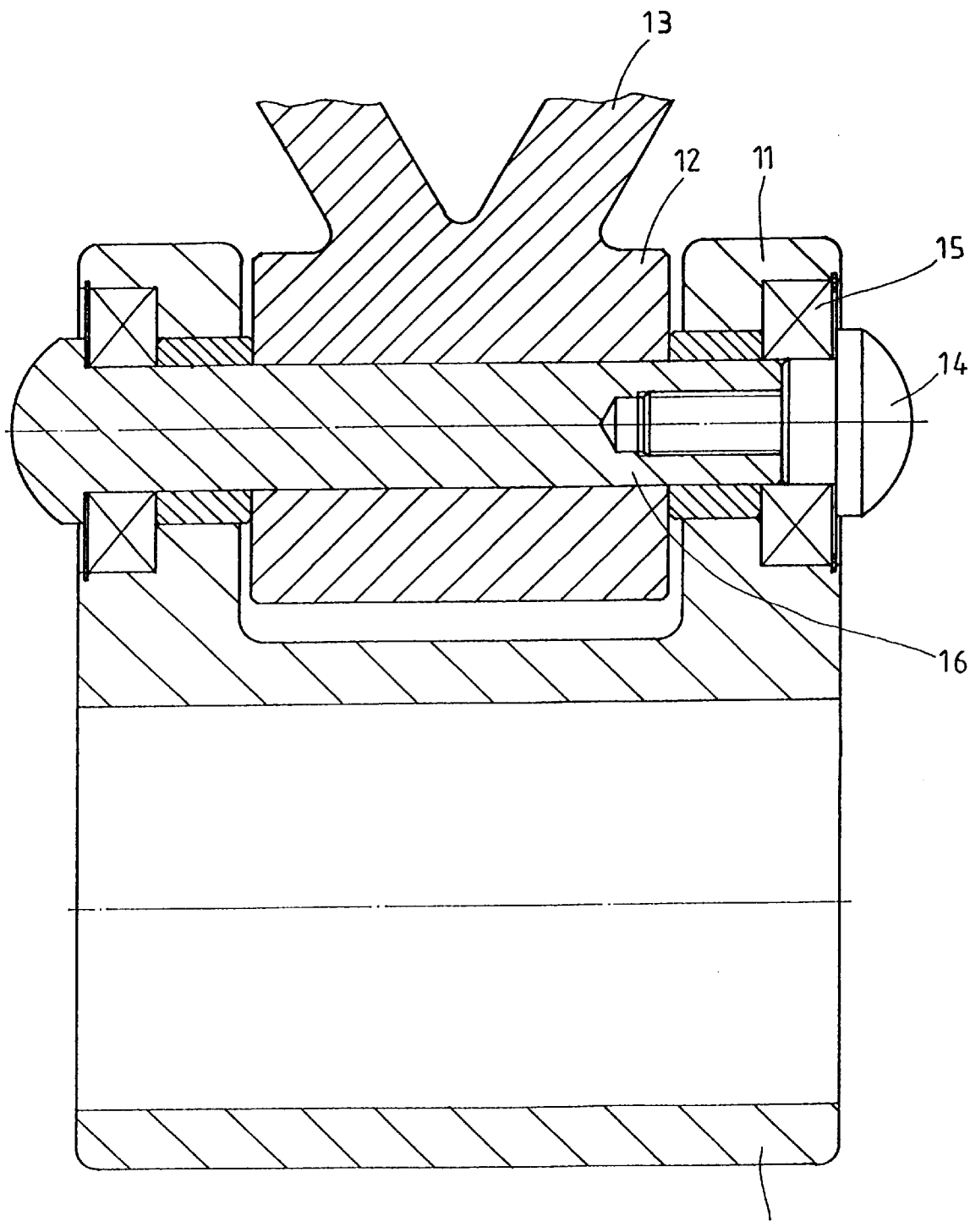
FIG. 4 is a side elevational view, partly in section, of the conventional cushion device.
Figure 5:
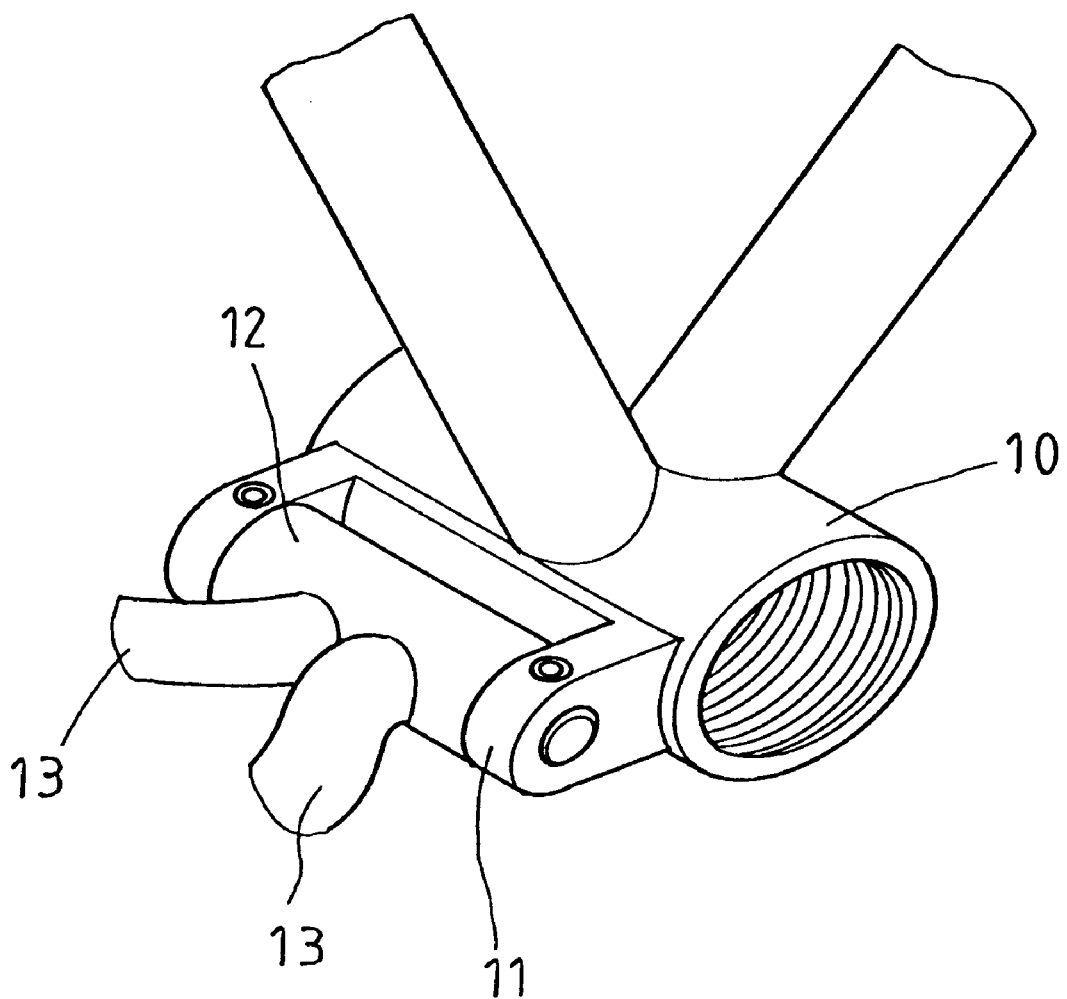
FIG. 5 is a perspective view of the conventional cushion device.

Referring to FIGS. 1 to 3, the cushion device in accordance with the present invention comprises a tube 20 mounted to the seat post 200 of the bicycle frame and having two lugs 21 extending radially outward from the tube 20. Each of the lugs 21 has a hole 210 defined therethrough and two recesses 211 are respectively defined in the outside of the two lugs 21 and communicate with the two holes 210.

Two positioning members 40 each have a cone-shaped end 41 extending through the hole 210 of the lug 21 corresponding thereto and a tapered neck 42 received in the recess 211 corresponding thereto. Each of the positioning members 40 has a passage 43 defined therethrough.

A connecting member 30 is pivotally received between the two lugs 21 and has two cone-shaped recesses 32 respectively defined in two ends thereof so as to receive the two cone-shaped ends 41 of the two positioning members 40. The two chain stays 300 respectively extend from the connecting member 30. A central hole 31 is defined through the connecting member 30 and communicates with the two cone-shaped recesses 32. Two ring members 212 are respectively received in the two recesses 211 of the two lugs 21 and two anti-thrust bearings 213 are respectively received between the two tapered necks 42 of the two positioning members 40 and the two ring members 212.

A pin 50 extends through the passages 43 of the two positioning members 30 and the central hole 31 of the connecting member 30. A bolt 51 is threadedly extending into one of two ends of the pin 50 and the head of the bolt 51 is engaged with the positioning member 40 corresponding thereto so as to position the bolt 50 and the two positioning members 40..

Each of the ring members 212 has a flange 2120 extending radially outward therefrom which is engaged with the outside of the lug 21 corresponding thereto so as to close the recess 211 of the lug 21 corresponding thereto. A gap is defined between the bottom defining each of the recesses 211 and the tapered neck 42 of each of the positioning members 40.

Accordingly, when the shocks are transferred to the cushion device of the present invention, the chain stays 300 together with the connecting member 30 are pivoted about the pin 50 between the two lugs 21. The engagement between the cone-shaped recesses 32 of the connecting member 30 and the tapered neck 41 of the two positioning members 40 will dispense the forces so that the pin 50 bears only a limited force such that the term of use of the pin 50 can be prolonged. Furthermore, the gaps 22 allow the two anti-thrust bearings 213 to be shifted toward the connecting member 30 when assembling the cushion device so that the functions of the bearings 213 are not limited. The flanges 2120 prevent dust from entering the interior of the recesses 211 so as to avoid from wearing by sands located between the ring members 212, the bearings 213 and the two positioning members 40. It is to be noted that the cushion device can be used to absorb the shocks transferred from the front wheel.

The invention is not limited to the above embodiment but various modification thereof may be made. It will be understood by those skilled in the art that various changes in form and detail may made without departing from the scope and spirit of the present invention.

What is claimed is:

1. A cushion device for a bicycle having a frame including a seat post, the cushion device comprising:

two lugs adapted to extend radially outward from the seat post and each of said lugs having a hole defined therethrough, two recesses respectively defined in the outside of said two lugs and communicating with said two holes of said two lugs;

two positioning members each having a cone-shaped end which extends through said hole of said lug corresponding thereto, each of said positioning members having a passage defined therethrough;

a connecting member located between said two lugs and having two cone-shaped recesses respectively defined in two ends thereof, a central hole defined through said connecting member and communicating with said two cone-shaped recesses, said two cone-shaped ends of said two positioning members respectively received in said two cone-shaped recesses;

a pin extending through said passages of said two positioning members and said central hole of said connecting member, and two ring members respectively received in said two recesses of said two lugs and two bearings respectively received between said two positioning members and said two ring members.

2. The cushion device as claimed in claim 1, wherein each of said ring members has a flange extending radially outward therefrom and said flange is engaged with the outside of said lug corresponding thereto.

3. The cushion device as claimed in claim 1, wherein said two bearings are anti-thrust bearings and said two positioning members each have a tapered neck to which said bearing corresponding thereto is engaged.

4. The cushion device as claimed in claim 3 further comprising a gap defined between the bottom defining each of said recesses and said tapered neck of each of said positioning members.

5. The cushion device as claimed in claim 1 further comprising a bolt threadedly extending into one of two ends of said pin.

* * * * *